United States Patent
Zufle

[11] Patent Number: 5,180,880
[45] Date of Patent: Jan. 19, 1993

[54] SOFT BODY ARMOR

[76] Inventor: T. Tyler Zufle, Square One, Lafayette at the River, Gretna, La. 70053-5835

[21] Appl. No.: 486,387

[22] Filed: Feb. 28, 1990

[51] Int. Cl.$^5$ .............................................. F41H 5/12
[52] U.S. Cl. ................................. 89/36.02; 428/113; 428/911
[58] Field of Search ....................... 428/113, 911, 218; 89/36.02

[56] References Cited

U.S. PATENT DOCUMENTS

| | | | |
|---|---|---|---|
| 4,623,574 | 11/1986 | Harpell et al. | 428/113 |
| 4,737,402 | 4/1988 | Harpell et al. | 428/252 |
| 4,883,700 | 11/1989 | Harpell et al. | 428/113 |
| 4,916,000 | 4/1990 | Li et al. | 428/105 |
| 4,953,234 | 9/1990 | Li et al. | 428/113 X |

Primary Examiner—Peter A. Nelson
Attorney, Agent, or Firm—Jacobson, Price, Holman & Stern

[57] ABSTRACT

A soft body armor in which a combination of dissimilar materials is utilized to produce a synergistic result as compared to utilization of a single type of material. The superior result provides increased resistance to penetration of the soft body armor by a projectile such as a bullet or other ballistic projectile. The dissimilar materials are arranged in a plurality of layers or plies of anti-ballistic material which can be utilized in various arrangements for protecting individuals and property from injury or damage from a projectile or other ballistic missile.

6 Claims, 3 Drawing Sheets

SOFT BODY ARMOR

BACKGROUND OF THE INVENTION

1. Field of the Invention

The present invention generally relates to an antiballistic body armor and more particularly a soft body armor in which a combination of dissimilar materials is utilized to produce a synergistic result as compared to utilization of a single type of material. The superior result provides increased resistance to penetration of the soft body armor by a projectile such as a bullet or other ballistic projectile. The dissimilar materials ar arranged in a plurality of layers or plies of ballistic material which can be utilized in various arrangements for protecting individuals and property from injury or damage from a projectile or other ballistic missile. In one embodiment of the invention, the multiple plies of ballistic material include a unique arrangement of multiple plies of an aramid fiber such as that identified by the trademark "Kevlar" or that identified by the trademark "TWARON" and multiple plies of non-woven ballistic material available under the trademark "Spectra Shield". In another embodiment of the invention, the multiple plies of ballistic material include a unique arrangement of multiple plies of an aramid fiber identified by the trademark "Kevlar" or the trademark "TWARON" and multiple plies of ballistic nylon. Another embodiment of the invention utilizes an anti-ballistic material constructed of yarn of two separate materials woven in a standard procedure with the warp yarn being an aramid fiber such as "Kevlar" or "TWARON" having very low elasticity characteristics with the fill yarn being constructed of nylon having high elasticity characteristics with the blend of the two yarns providing a synergistic yarn in which the two characteristics, namely, the low elasticity warp yarn and the high elasticity fill yarn, producing a flexible fabric armor that is effective as an anti-ballistic material. The present invention also includes a unique arrangement of soft body armor used to protect vehicle drivers or occupants from ballistic attack which generally is in the form of a rectangular seat drape which holds and retains the soft fabric armor in place with a narrow extension of the drape and armor extending up behind the driver's head thus providing effective protection for a vehicle driver or occupant in which the dissimilar materials provide a synergistic result.

2. Information Disclosure Statement

Body armor has been developed for use by individuals to protect the wearer from injury or death by ballistic attack. My prior U.S. Pat. Nos. 4,535,478 and 4,578,821 disclose body armor which has been developed for this purpose and which include the use of "Kevlar" as a ballistic material. Law enforcement personnel and other individuals subject to ballistic attack have found body armor effective in significantly reducing injury and death from ballistic attack. Also, the prior art made of record during prosecution of the applications which matured into the above patents disclose developments in body armor and the following U.S. patents also disclose developments relevant to the soft body armor of this invention.

U.S. Pat. No. 2,816,578
U.S. Pat. No. 3,256,130
U.S. Pat. No. 4,181,768
U.S. Pat. No. 4,186,648
U.S. Pat. No. 4,466,135
U.S. Pat. No. 4,574,105
U.S. Pat. No. 4,623,574

The prior art does not disclose the use of multiple plies of dissimilar materials to produce a synergistic penetration resistance to soft body armor and do not disclose use of such a soft body armor to protect a vehicle driver or occupant.

SUMMARY OF THE INVENTION

An object of the present invention is to provide a soft body armor incorporating a combination of dissimilar materials utilized in a multiple ply or layer arrangement to produce a synergistic resistance to penetration of the body armor by ballistic projectiles thereby protecting individuals or property from injury or damage from ballistic attack.

Another object of the invention is to provide a soft body armor in which the multiple plies or layers are constructed of "Kevlar" or "TWARON" and "Spectra Shield".

A further object of the invention is to provide a soft body armor in which the multiple plies or layers are constructed of "Kevlar" or "TWARON" and ballistic nylon.

Still another object of the invention is to provide a soft body armor in which the multiple plies or layers are constructed of a ballistic material utilizing warp yarn of "Kevlar" or "TWARON" and fill yarn of nylon.

A still further object of the invention is to provide a soft body armor in accordance with the preceding objects utilized in a unique structural arrangement to protect the operator and/or occupants of a vehicle from ballistic attack.

Still another significant feature of the invention is the construction of soft body armor of a plurality of plies or layers of dissimilar materials in which the plies or layers of dissimilar materials are arranged in a unique combination and arrangement of the dissimilar materials to produce a synergistic resistance to penetration by ballistic projectiles.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
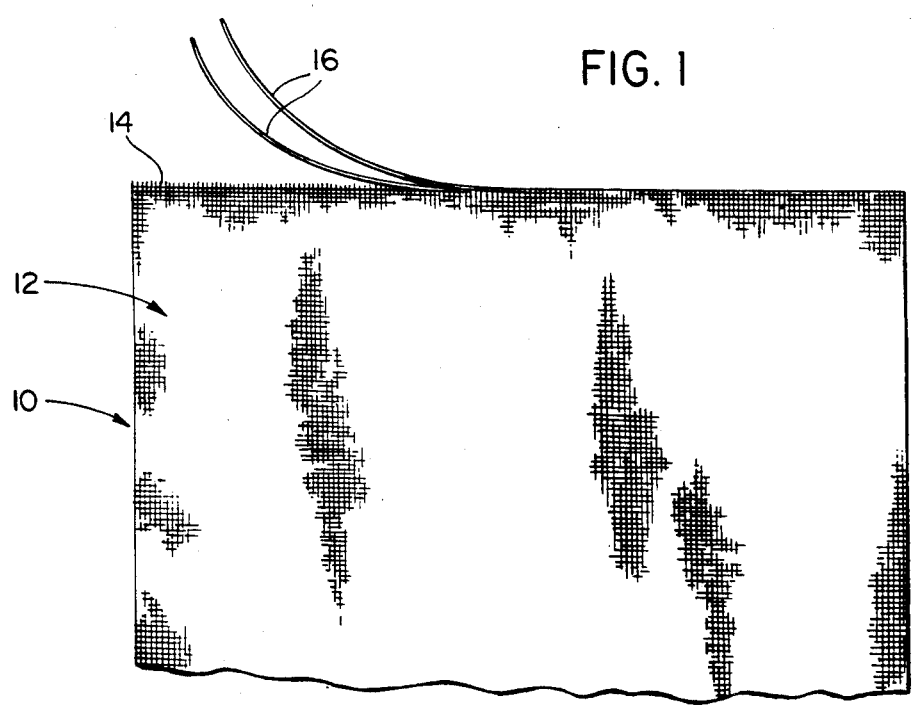
FIG. 1 is a plan view of the soft body armor utilizing ballistic material in which the warp yarn and fill yarn are of dissimilar materials.
Figure 2:
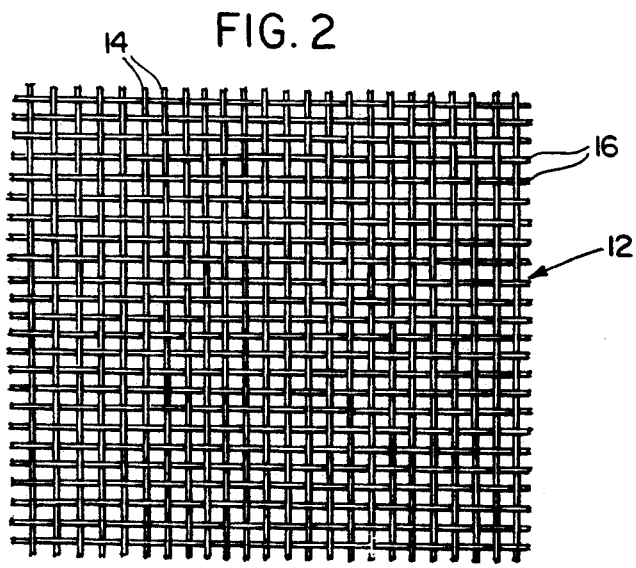
FIG. 2 is an enlarged, fragmental plan view illustrating the warp and fill yarn.
Figure 3:
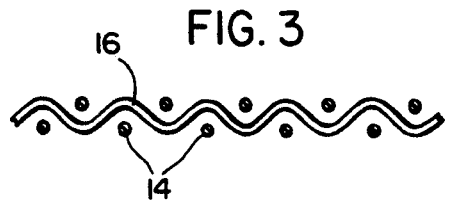
FIG. 3 is a detailed, sectional view of a fragment of the ballistic material.

Referring now specifically to FIGS. 1-3 of the drawings, the soft body armor of this invention includes ballistic material generally designated by reference numeral 10 and is in the form of an anti-ballistic material 12 of woven material which includes warp yarn 14 and fill yarn 16 woven in a conventional manner with the warp yarn 14 extending lengthwise of the fabric and being constructed of a material having a low modulus of elasticity. The warp yarn 14 is an aramid fiber such as "Kevlar" or "TWARON". The fill yarn 16 has a high modulus of elasticity and is constructed of a thermoplastic material such as nylon. The combination of the low elastic aramid fiber in the warp yarn and the high elastic fiber of nylon in the fill yarn produces a fabric material 12 which has some degree of resiliency in the direction transversely of the warp and very little elasticity in the direction of the warp yarn.

Blending the low and high elasticity characteristics of the two yarns produces a highly effective flexible armor material in which the aramid yarn having low elasticity is in the warp direction and the nylon yarn which has high elasticity is in the fill direction. The fabric resulting from the blending of the two yarns can be layered by placing them on top of each other and can be connected together by stitching, sewing or button tack arrangements at close intervals to make a multi-layered anti-ballistic material. The layers may be arranged in various sequences to produce an effective penetration resistant fabric. The "Kevlar" or "TWARON" is relatively hard and non-melting, and provided with high tensile strength whereas the nylon is yielding and more readily melts from the heat generated by a projectile trying to penetrate the material as the projectile attempts to pass through the surface of the fabric. This attempt to pass through the material causes great friction at the entry point on the "Kevlar" or "TWARON" yarn which dissipates a large portion of the energy of the projectile. As the diminished energy projectile continues to penetrate the material, the melt of the nylon and additional layers of the material support the melting nylon thus deforming and trapping the projectile.

Figure 5:
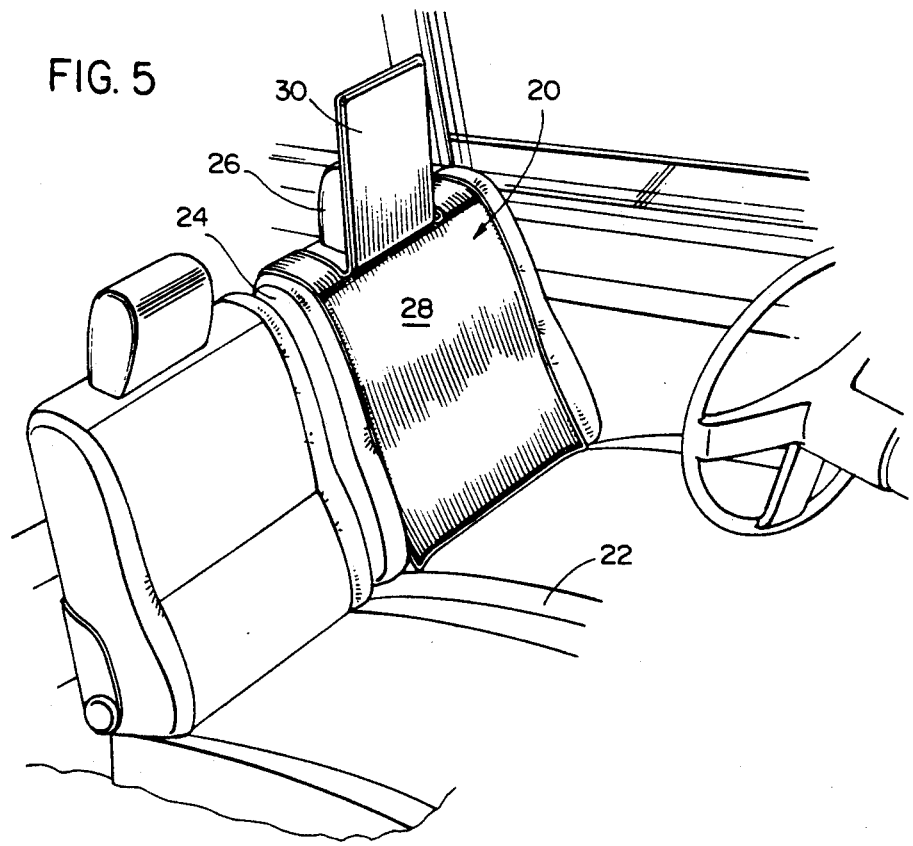
FIG. 5 is a perspective view illustrating the soft body armor of the present invention associated with the driver's seat of a vehicle.
Figure 6:
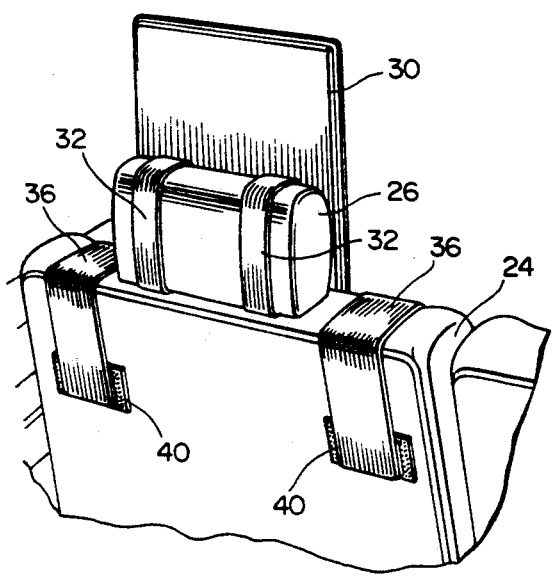
FIG. 6 is a fragmental, rear perspective view of the driver's seat illustrating the manner in which the soft body armor is connected to the vehicle seat.

Referring now specifically to FIGS. 5-9, the soft body armor disclosed in this embodiment of the invention is generally designated by reference numeral 20 and is associated with a vehicle seat 22 and seat back 24 having the usual headrest 26 at the upper edge thereof. The body armor 20 includes a generally rectangular panel or seat drape 28 which is positioned against the forward surface of the seat back. The drape 28 includes a narrow central portion 30 projecting from one edge thereof which extends upwardly in front of the headrest 26 to protect the head of the vehicle operator. The rear surface of the narrow extension 30 is provided with a pair of elastic straps 32 attached to the extension 30 by stitching 34 at the ends thereof with the elastic straps being in spaced parallel relation to extend around the headrest 26 to support the head protecting extension 30 along the front surface of the headrest 26 as illustrated in FIG. 6. Alongside of but free of the extension 30, mounting strips 36 are provided as extensions from the same edge of the seat drape 28 as the extension 30 with the mounting strips being on opposite sides of the extension 30 and being slightly shorter and also narrower than the extension 30. The free end portion of each mounting strip 36 is provided with a generally rectangular area 38 of the pile or loop component of a hook and pile fabric connector such as that sold under the trademark "Velcro". The rear surface of the seat 24 is provided with a pair of spaced strips 40 of the hook component of the hook and pile fabric connector. When the body armor 20 is positioned against the front of the seat, the elastic straps 32 will hold the extension 30 in front of the headrest 26 and the strips 36 will extend over the top edge of the seat back with the pile fabric patches 38 detachably and securely engaged with the hook fabric patches 40 thus securing the body armor in position in relation to the vehicle seat back 24.

The body armor 20 may be increased in width to extend completely across the front seat or rear seat of various types of vehicles including taxi cabs, limousines and conventional passenger cars. The narrow extension 30 which extends up behind the driver or occupant's head includes a rigid component and may be constructed of opaque material or clear material which can protect the driver's head and neck. The "Velcro" equipped straps along with the elastic straps 32 engaging the headrest anchor the armor in place. Also, the seat drape 28 can be elongated to cover the upper surface of the seat 22 and also extend downwardly in front of the seat and along the upper surface of the floor mat or floor board and along the fire wall area as well as extended vertically on the side edges to cover the door area thus affording additional protection for the vehicle operator or occupant. This type of structure would also serve to deflect a blast from a land mine or grenade thus affording additional protection for the vehicle driver or occupants.

In this arrangement, the concept of zoned armor can be used and includes a plurality of outer plies of "Kevlar" or "TWARON" backed by a plurality of plies of ballistic nylon in a sandwich arrangement which provides a synergistic resistance to penetration of a ballistic missile inasmuch as the aramid outer plies are very hard and non-melting while the ballistic nylon is yielding and readily melts from the heat generated by the incoming projectile as it attempts to pass through the "Kevlar" or "TWARON" surface. This causes friction at the entry point on the "Kevlar" or "TWARON" thus dissipating a large portion of the energy of the projectile and as the projectile which has a reduced energy traversing the inner nylon plies and begins an attempt to exit the mat, the outermost plies of the "Kevlar" or "TWARON" at the back of the sandwich support the nylon thus deforming and trapping the projectile. In addition, the use of the combination of the "Kevlar" or "TWARON" and nylon reduces the overall costs of the body armor while still producing the synergistic result.

Figure 4:
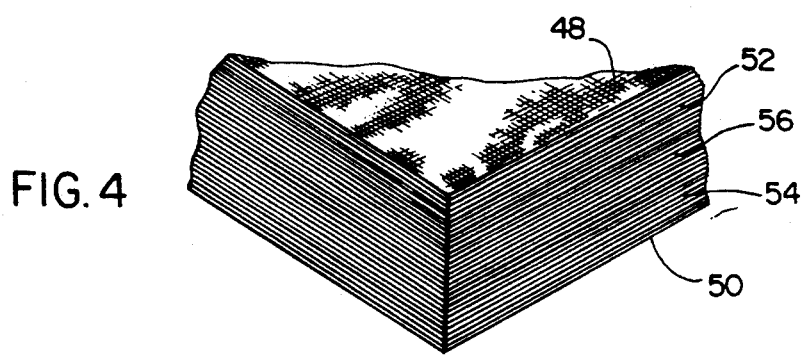
FIG. 4 is a fragmental, perspective view of one corner of the multiple plies of dissimilar material used in the body armor.
Figure 7:
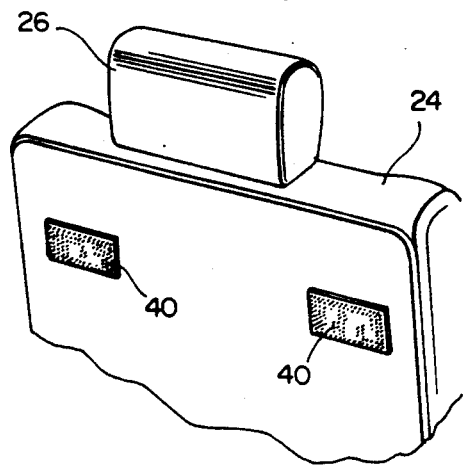
FIG. 7 is a fragmental, perspective view similar to FIG. 6 but illustrating the attachment strips on the rear surface of the seat back.
Figure 8:
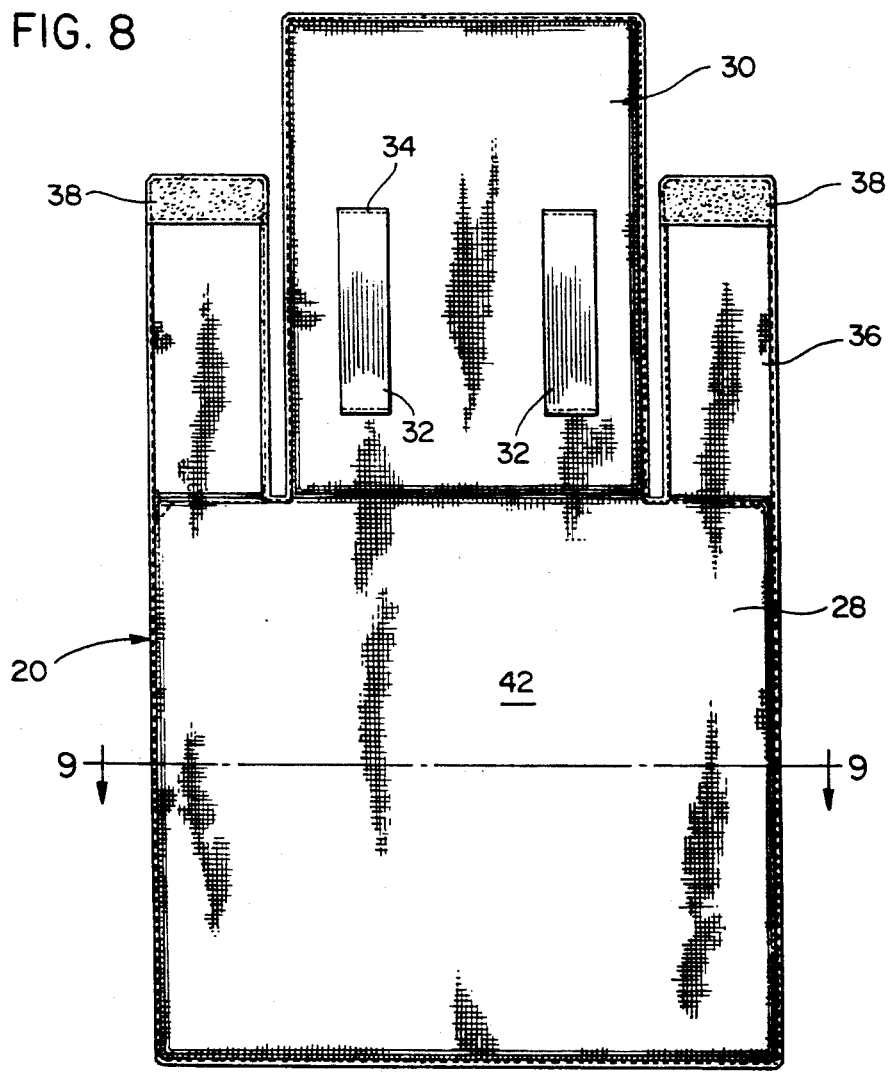
FIG. 8 is a plan view of the soft body armor illustrated in FIG. 4.
Figure 9:
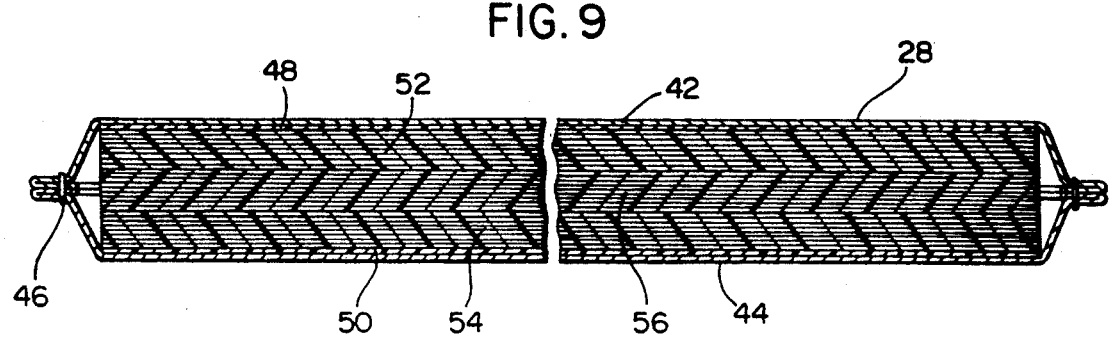
FIG. 9 is a transverse, sectional view, on an enlarged scale, taken substantially upon a plane passing along section line 9—9 on FIG. 8 illustrating the specific construction and arrangement of the multiple plies or layers of dissimilar materials utilized in the soft body armor of this invention.

FIGS. 4 and 9 illustrate an arrangement of multiple plies or layers of dissimilar materials which can be used in the structure illustrated in FIGS. 5-7 but also can be used in various types of soft body armor with the structure including spaced fabric layers 42 and 44 stitched together along the periphery as at 46 to form a pocket to receive the layers of dissimilar material. This arrangement may be retained in assembled condition by sewing, stitching or button tack arrangements at a plurality of points. The body armor includes outer single plies 48 and 50 of "Kevlar" or "TWARON". These outer plies act as a fireproofing device, an impact surface for an incoming projectile and reinforcing plies to support button tacking as the joining mechanism.

Positioned inwardly of the outer ply 48 are eight plies 52 of "Spectra Shield". Likewise, inwardly of the outer ply 50 are eight plies 54 of "Spectra Shield". Positioned between the plies 52 and 54 of "Spectra Shield" are ten plies 56 of "Kevlar" or "TWARON". The layers or plies of materials may be joined together by a button tack arrangement in a specific pattern with the resultant hybrid combination of soft armor materials providing a substantial weight reduction as compared to current industry standards as well as a substantial reduction in the thickness or bulk of the material. While this arrangement may be used in the vehicle occupant armor as shown, it is also useful in many other adaptations requiring protection against ballistic attack.

The ballistic fabric 10 disclosed in FIGS. 1-3 utilizes picks and ends of "Kevlar" or "TWARON" in one direction and ballistic nylon in the other direction which produced a synergistic result. However, "Spectra Shield" material is not a woven product but a composite product and can be used in the ballistic material 10 illustrated in FIGS. 1-3 with this material utilizing a similar picks and ends arrangement of "Spectra Shield" in one direction and "Kevlar" or "TWARON" in the other. This combination of "Kevlar" or "TWARON" fibers and "Spectra Shield" fibers in the same composite matrix produces a synergistic result of increased resistance to penetration by a ballistic missile.

"Spectra Shield" material is made by utilizing a plastic film with adhesive on which closely aligned strands or filaments are brought into contact and bonded thereto and two of these adhesive membrane sheets are then combined in the X-Y axis to form a 0°-90° sandwich.

The materials from which the soft body armor is constructed are commercially available and their characteristics are well known. The aramid fiber available under the trademark "Kevlar" is manufactured by Dupont. The aramid fiber available under the trademark "TWARON" is manufactured by Akzo The non-woven ballistic fabric is sold under the trademark "Spectra Shield" and is available from Allied Chemical Company.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A soft body armor comprising multiple independent plies of ballistic material, said plies being constructed of dissimilar material, each ply of said ballistic material being woven with independent warp yarns having a low modulus of elasticity and independent fill yarn having a high modulus of elasticity, said warp yarn being constructed of aramid fiber, said fill yarn being constructed of thermoplastic material, said aramid fiber including a hard surface and high tensile strength to dissipate energy of a ballistic projectile trying to penetrate the armor.

2. The soft body armor as defined in claim 1 wherein said thermoplastic material forming the fill yarn is nylon and is meltable from heat generated by a ballistic projectile attempting to pass through and between the aramid fiber yarn.

3. The soft body armor as defined in claim 2 wherein said multiple lies of ballistic material are retained in overlying contacting relation to form soft body armor.

4. A ballistic armor for use in combination with a supporting structure in protective relation to a protected surface to prevent damage to the surface by a projectile approaching the surface at a relatively high velocity, said armor comprising a plurality of independent overlying plies, of ballistic material including single outer plies of an aramid fiber and a plurality of layers of aramid fiber and non-woven ballistic material with two groups of multiple plies of non-woven ballistic material engaging the outermost single plies of aramid fiber and a group of a plurality of plies of aramid fiber between the groups of non-woven fibers.

5. The structure as defined in claim 4 wherein said groups of non-woven ballistic fiber are "Spectra Shield" and the group of aramid fibers is "Kevlar" or "TWARON".

6. The structure as defined in claim 5 wherein each of the two groups of "Spectra Shield" includes eight plies thereof, said group of plies of "Kevlar" or "TWARON" including ten plies.

* * * * *